(12) United States Patent
Schambach

(10) Patent No.: US 6,405,883 B1
(45) Date of Patent: Jun. 18, 2002

(54) STACKING COLUMN FOR RECEIVING AND HOLDING A PLURALITY OF FLAT WORKPIECES

(76) Inventor: Peter Schambach, Grosskopfstr 4, 13403 Berlin (DE)

( * ) Notice: Subject to any disclaimer, the term of this patent is extended or adjusted under 35 U.S.C. 154(b) by 0 days.

(21) Appl. No.: 09/263,794

(22) Filed: Mar. 5, 1999

(30) Foreign Application Priority Data

Mar. 6, 1998 (DE) ...................................... 298 03 921 U

(51) Int. Cl.⁷ .................................................. A47F 5/08
(52) U.S. Cl. ...................................... 211/150; 211/59.4
(58) Field of Search ........................... 211/150, 41.1,
211/59.4, 149, 59.3; 269/212, 42, 43, 45,
59.5, 67, 68, 107; 53/244

(56) References Cited

U.S. PATENT DOCUMENTS

| 1,186,671 | A | * | 6/1916 | McKenzie | 269/53 X |
| 1,344,862 | A | * | 6/1920 | Cashman | 269/53 X |
| 1,954,920 | A | * | 4/1934 | Damerell | 77/18 |
| 2,692,749 | A | * | 10/1954 | Cripe et al. | 248/240 |
| 2,738,987 | A | * | 3/1956 | McDonald | 280/166 |
| 2,827,200 | A | * | 3/1958 | Lux | 221/90 |
| 4,572,382 | A | * | 2/1986 | Niederprum | 211/150 |
| 4,712,691 | A | * | 12/1987 | Grill et al. | 211/49.1 |
| 4,836,518 | A | * | 6/1989 | Janutta | 269/43 |
| 5,005,712 | A | * | 4/1991 | Niederprum | 211/150 |
| 5,301,824 | A | * | 4/1994 | Schoeller | 211/150 |
| 5,938,051 | A | * | 8/1999 | Scholler et al. | 211/150 |

FOREIGN PATENT DOCUMENTS

JP  0212528  * 12/1983  ................. 211/150

* cited by examiner

*Primary Examiner*—Daniel P. Stodola
*Assistant Examiner*—Khoa Tran
(74) *Attorney, Agent, or Firm*—Birch, Stewart, Kolasch & Birch, LLP

(57) ABSTRACT

A stacking column for recieving and holding a plurality of substantially flat workpieces, having a plurality of pawls mounted for movement on pawl bearings inside a frame and each having a workpiece stop, individually triggerable latching pins for individually fixing pawls in their workpiece-holding positions, and an erecting mechanism for erecting a next pawl needed for receiving a workpiece.

7 Claims, 5 Drawing Sheets

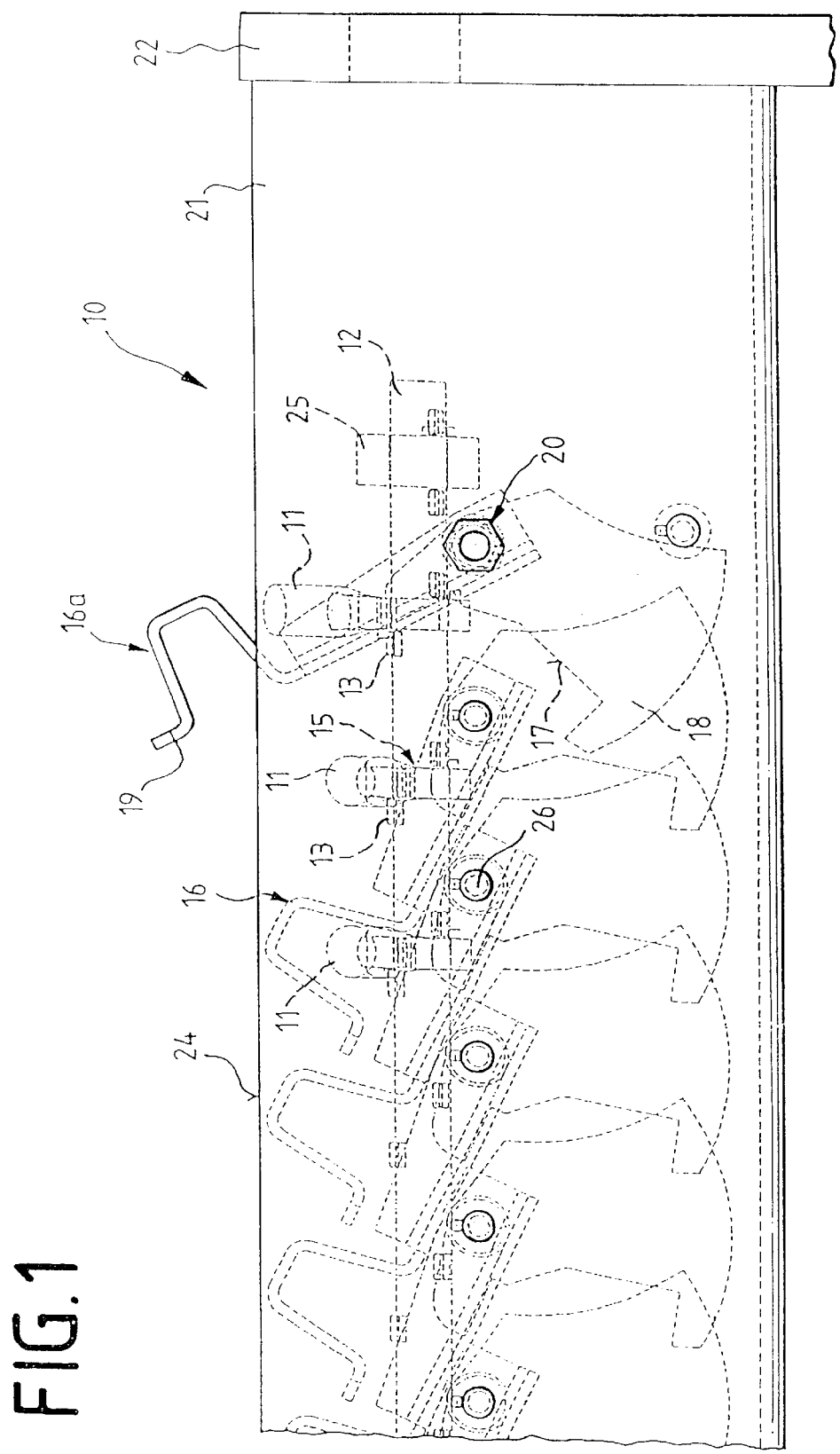

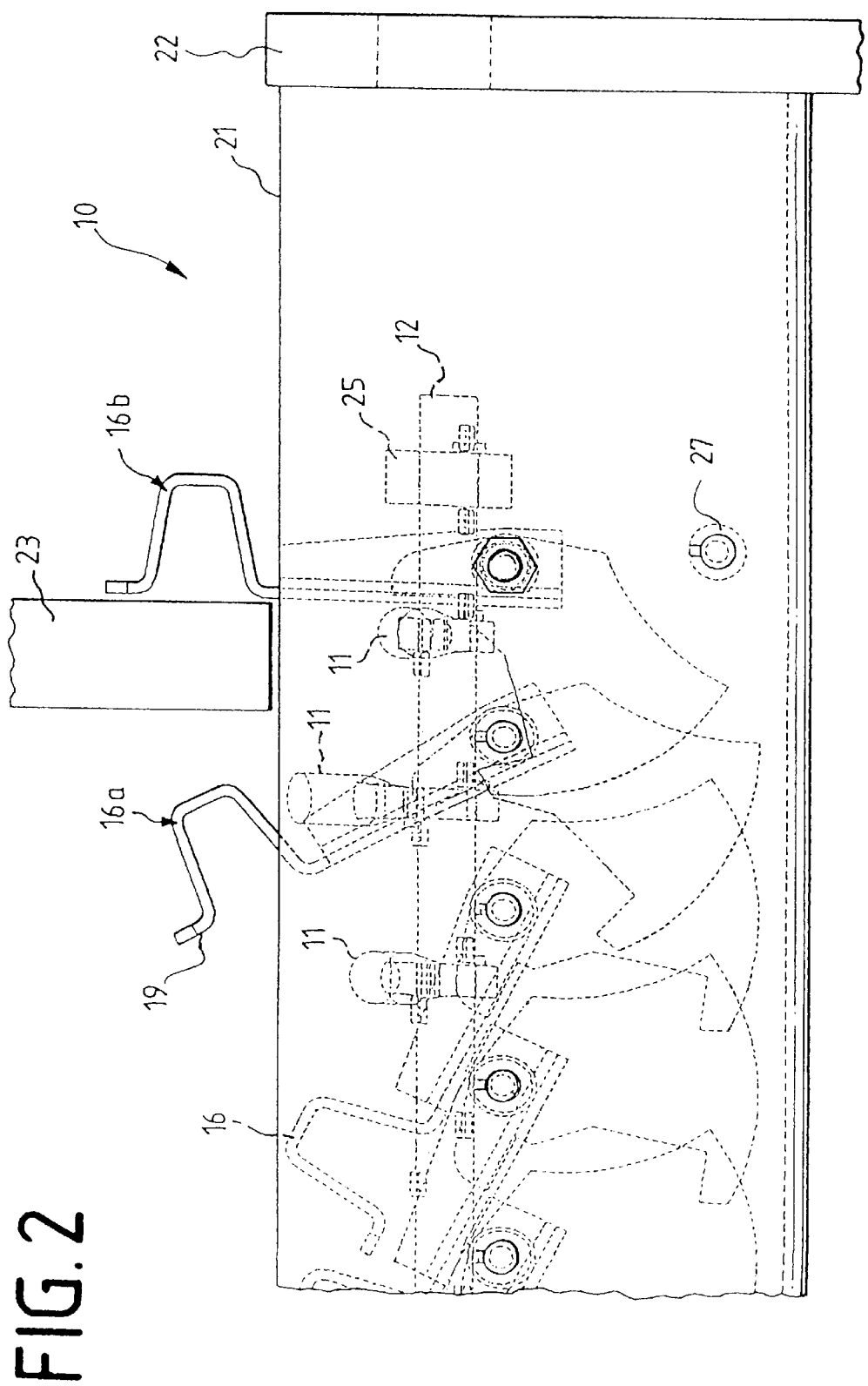

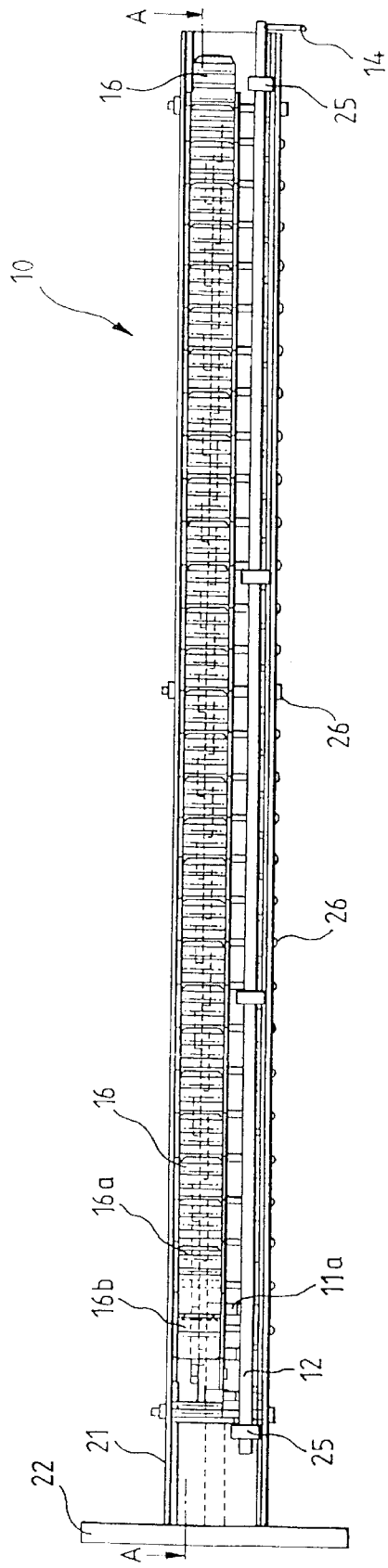

STACKING COLUMN FOR RECEIVING AND HOLDING A PLURALITY OF FLAT WORKPIECES

BACKGROUND OF THE INVENTION

1. Field of the Invention

The invention relates to a stacking column for receiving and holding a plurality of flat workpieces.

2. Related Art

In just-in-time production and the outsourcing of portions of a production process, major portions of semi-fabricated products and outsourced parts must be shipped from producers to assemblers under strict deadlines. In order to reduce shipping costs, the parts to be delivered must be packaged in a space saving manner and arranged efficiently on some shipping medium. This requirement frequently is not compatible with safe and damage-free transportation.

Specifically, there exists in the automotive industry a need to transport major quantities of similar parts made of sheet metal or glass which are substantially flat. This usually is done in so-called stacking columns, which in turn are arranged in shipping containers. The stacking columns are intended to maintain the flat parts in a uniformly spaced relationship precluding mutual damage.

A drawback of these shipping containers is that the work-pieces cannot be locked or latched in place individually; instead, all of them are locked at the same time. Further, the locking mechanism employed in prior stacking columns makes them unsuitable for the use of robots.

SUMMARY OF THE INVENTION

It is the object of the present invention to provide structure permitting workpieces to be locked separately and suited to be loaded and unloaded by means of a robot.

This object is achieved by a stacking column including a plurality of pawls mounted in a frame for movement in pawl bearings and each having a workpiece stop, latch pins adapted to be triggered individually to individually lock the pawls in their workpiece-holding position, and erecting means for erecting a subsequent pawl needed for receiving a workpiece. The erecting means are in the form of a cam and a hammer head on the pawls, with the erecting movement of a preceding ding pawl moving the subsequent pawls to an armed position. In another embodiment of the inventive mechanism, the cams are arranged one behind the other. When the column is being loaded, the workpiece is pushed over the top edge of the frame, with workpiece contact with the workpiece stop causing the pawl to be moved from the armed to its erected position.

After a pawl has been moved to its erected position, the latching pin drops into its latching position in front of the pawl, so that the pawl cannot move back into its lying or armed position.

In order to enable each pawl to be latched individually, each has a latching pin associated with it. The latching pins are mounted for independent movement on a pin shaft. The pin shaft has unlatching cams thereon effective to remove all latching pins from their latching positions in unison. An unlatching lever is provided to turn the pin shaft so as to lift the latching pins from their latching positions.

The inventive structure achieves maximum functionality when oriented horizontally. However, a lateral sloping angle of 90° to 45° is possible. Modifying the cam to act as a lifting cam will ensure functionality in the range of 0 ° to 45°. In this embodiment, the latching mechanism remains the same.

The movable parts —such as the receiving surface, the cam, the latching pins, and the unlatching cam shaft— referably are made of stainless steel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 1 shows a partial side view of a stacking column comprising a frame delimited by a frame end panel, a plurality of pawls disposed within the frame, with one of said pawls held in its armed position, latching pins mounted for movement on a pin shaft, and unlatching cams disposed alone the cam shaft to lift the latching action;

FIG. 2 shows a partial side view of the stacking column of FIG. 1, including a pawl in its erected position to support a workpiece and having moved another pawl to its armed position;

FIG. 6 shows a partial plan view of the stacking column of FIG. 1 without the second frame end panel.

DETAILED DESCRIPTION OF THE PREFERRED EMBODIMENT

Figure 3A:
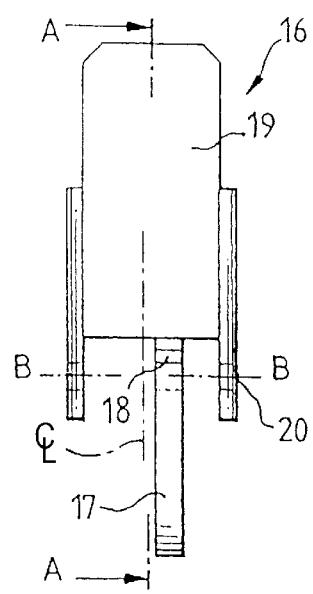
FIGS. 3a, 3b, 3c and 3d show various views of a pawl, including a cam, a hammer head, a workpiece stop and a pawl bearing.

As shown in FIGS. 1 and 2, a stacking column 10 comprises a—preferably—U-shaped supporting member in the form of a frame 21 delimited by frame end panels 22. Within frame 21, a plurality of pawls 16, 16a, 16b are mounted for rotary movement about pawl bearings 20. Pawls 16, 16a, 16b include workpiece stops 19 to engage workpieces 23 prefabricated to be substantially flat by deep-drawing, pressing, punching or the like.

The substantially flat workpieces 23 are aligned for shipment and fixed in position by workpiece stops 19. When stacking column 10 is oriented horizontally, the weight distribution of pawls 16, 16a, 16b causes them to tilt forwardly. As a result, the top edge of pawls 16 comes to lie below the workpiece depositing edge 24 of frame 21.

In another embodiment of the invention, pawls 16, 16a, 16b are moved by springs (not shown) to their lying position.

This makes it possible to use the stacking column in a vertical orientation also.

Each pawl 16, 16a, 16b has a cam 17 and a hammer head 18 to act on and orient the adjacent pawl. Hammer head 18 urges pawl 16a into an armed position as soon as a workpiece 23 has urged the preceding pawl 16b into its armed position. In the erecting movement of pawl 16b, hammer head 18 is moved to turn about the pawl bearing 20 of the subsequent 16a so as to lift pawl 16a by exerting pressure on the lower workpiece stop 19.

The angle of rotation of first pawl 16a is limited by a pawl stop 27 so that it initially assumes its armed position even without a workpiece 23 being present.

FIG. 2 shows a pawl 16a in its armed position. Pawl 16b has been erected by workpiece 23 which preferably may have been pushed by a robot across the depositing edge 24 of frame 21 in a direction towards pawl 16b. As workpiece 23 contacts workpiece stop 19, pawl 16b is turned into its erected position. This movement initially raises latching pin 11; its weight distribution then causes it to drop in front of pawl 16b along workpiece receiving back 19. As a consequence, latching pin 11 prevents pawl 16b from dropping back into its armed or lying position.

In another embodiment (not shown), a spring is provided to urge latching pin 11 into its latching position in front of pawl 16b. This ensures indentical functionality without dependence on a horizontal orientation of stacking column 10.

Latching pins 11 are mounted on a pin shaft 12 extending along the entire length of frame 21. In the area where pawls 16, 16a, 16b are mounted, pin shaft 12 has unlatching cams 13 thereon shaped to lift latched pawls 16b by a rotation of pin shaft 12. Pin shaft 12 is journalled in pin shaft bearings 25 connected with frame 21.

Figure 5:
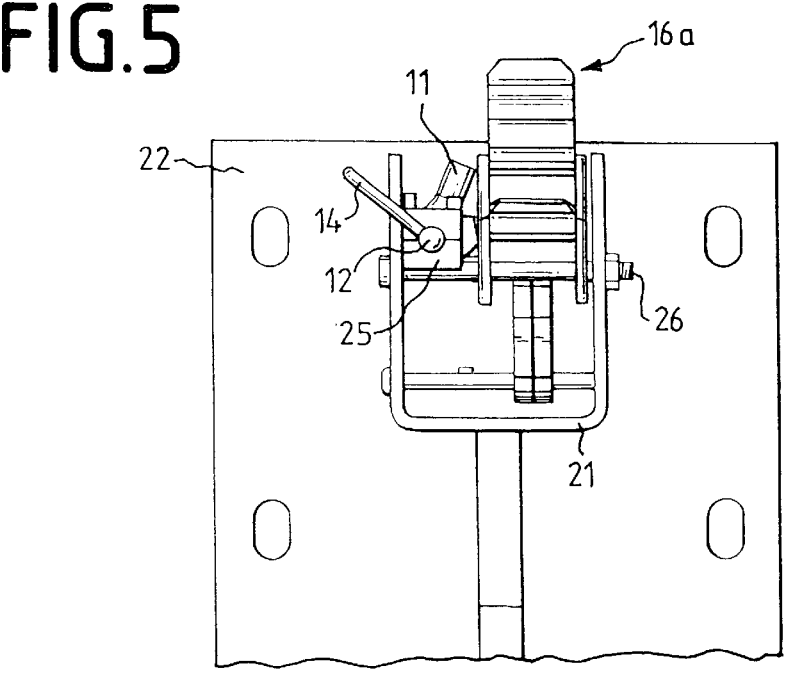
FIG. 5 shows a front view of the stacking column of FIG. 4, including an unlatching lever acting on the pin shaft.

As shown in FIG. 5, pin shaft 12 has at least one end thereof an unlatching lever 14; unlatching lever 14 may be rotated to raise latching pins 11.

FIGS. 3a, 3b, 3c and 3d show a possible configuration of pawl 16. Hammer head 18 and the associated cam 17 is connected with workpiece stop 19 to form a L-shape, with pawl bearing 20 extending through the intersection of the two legs of the L-shape.

Figure 3B:
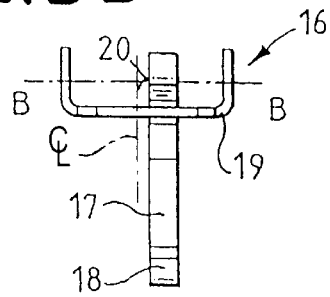
Figure 3C:
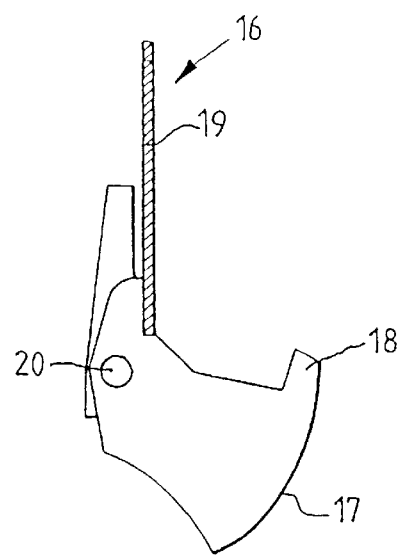
Figure 3D:
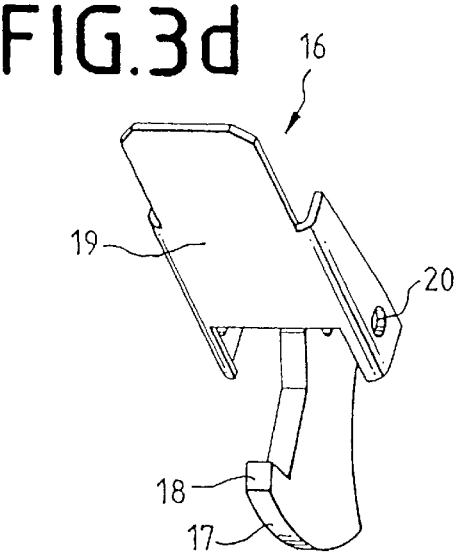

As hammer head 18 is a heavy solid member, workpiece stop 19 slopes downwardly in a rotary bearing. As shown in FIGS. 3a and 3b, hammer head 18 is preferably connected to workpiece stop 19 in an offset position, with hammer heads 18 alternatingly disposed on the righthand side of line A—A (also shown as a centerline in the figures) and on the lefthand side of line B—B to keep the mutually lifting pawls 16b, 16a from interfering with each other.

In another embodiment (not shown), the cams are disposed one behind the other and shaped differently.

In dependence on the configuration of workpiece 23, workpiece stops 19 are shaped differently. If workpieces 23 are high and planar, workpiece stops 19 are higher as well.

Figure 4:
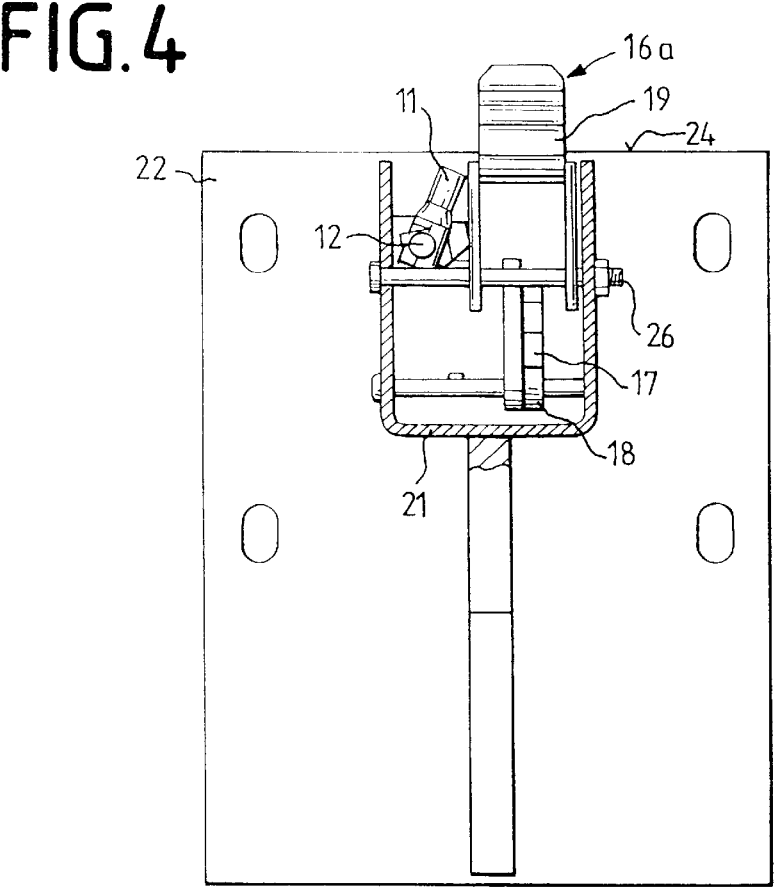
FIG. 4 shows a front view of a stacking column of FIG. 1 including a frame end panel and a pawl in its armed position and with its latching pin not in its latching position.

FIGS. 4 and 5 show the offset arrangement of hammer head 18 and cam 17. They also show the U-shape of frame 21, which is limited on one side by a frame end plate 22. Frame end plate 22 preferably serves to secure stacking column 10 inside a shipping container (not shown).

FIG. 5 shows unlatching lever 14 integrally connected with pin shaft 12. Turning unlatching lever 14 causes latching pins 11 to be moved into their erected positions. Thereafter, latching pins will immediately assume their armed position again for latching pawls 16a, 16b, 16. This releases pawls 16b, which drop to their lying or resting positions.

FIG. 6 shows a plan view of stacking column 10. As may be seen, pin shaft bearings 25 are provided at both ends inside frame 21. Also, each pawl 16 has a pawl shaft 26 associated with it which extends inside the frame at a right angle to sectionline A—A from one side of frame 21 to the other. These pawl shafts 26 movably mount pawls 16 in pawl bearings 20.

What is claimed is:

1. A stacking column for receiving and holding a plurality of substantially planar workpieces, comprising:

a frame member having a first and second end, and having a plurality of bearings mounted therein;

a shaft member attached to and extending along a length portion of said frame member, said shaft member having a plurality of latching members attached thereto;

a plurality of pawls movably mounted on said plurality of bearings, respectively, each of said pawls having a workpiece stop member forming a first distal end thereof and an erecting means forming a second distal end thereof, each of said erecting means for assisting movement of said pawls, and at least one of said erecting means is offset from a centerline of said workpiece stop member; and a pawl stop member positioned within said frame member, wherein said plurality of pawls are positioned in succession within said frame member along a length thereof, several of said plurality of pawls are capable of movement from a rest position, through an armed position, to an erect position, and a first pawl of said plurality of pawls is prevented from achieving said rest position by said pawl stop member, thereby said first pawl is in a ready state for receiving a first workpiece, and each of said plurality of pawls is associated with one of said plurality of latching members, each of said plurality of latching members is mounted for independent movement on said shaft member and allow each of said plurality of pawls to be individually fixed in said erect position.

2. The stacking column as in claim 1, wherein said erecting means is comprised of a cam member having a hammer head extending therefrom, wherein during forward movement of each of said plurality of pawls to said erect position, said cam member having said hammer head moves therewith and comes into abutment with a pawl being immediately adjacent therewith, thereby moving said pawl to at least said armed position.

3. The stacking column as in claim 1, wherein said shaft member has a plurality of unlatching cam members disposed thereon, each of said plurality of unlatching cam members being associated with each of said plurality of latching members, and for facilitating release of each of said plurality of latching members from a latched position, respectively.

4. The stacking column as in claim 1 wherein each of said plurality of latching members has a lever member integrally attached thereto, said lever member of each of said plurality of latching members for raising each of said latching members to an erect position.

5. The stacking column as in claim 1, wherein, except for said first pawl, an uppermost portion of each of said plurality of pawls, in said rest position, is positioned just below an edge of said frame member.

6. The stacking column as in claim 1, wherein said frame member is formed substantially in a U-shape, an opening of said U-shape permitting movement of each of said plurality of pawls from said rest position to said erect position.

7. The stacking column as in claim 1, wherein each consecutive erecting means of each consecutive pawl of said plurality of pawls has an offset position which varies from a preceding, or a succeeding erecting means of said plurality of pawls.

* * * * *